United States Patent
Liaw et al.

(10) Patent No.: US 8,102,464 B2
(45) Date of Patent: Jan. 24, 2012

(54) AUTOMATIC FOCUSING METHOD IN HIGH-NOISE ENVIRONMENT AND DIGITAL IMAGING DEVICE USING THE SAME

(75) Inventors: Ming-Jiun Liaw, Mialoi County (TW); Shih-Yuan Peng, Taipei County (TW)

(73) Assignee: Altek Corporation, Hsinchu (TW)

( * ) Notice: Subject to any disclaimer, the term of this patent is extended or adjusted under 35 U.S.C. 154(b) by 361 days.

(21) Appl. No.: 12/541,926

(22) Filed: Aug. 15, 2009

(65) Prior Publication Data
US 2010/0165177 A1    Jul. 1, 2010

(30) Foreign Application Priority Data
Dec. 31, 2008  (TW) .............................. 97151793 A (51) Int. Cl.
*H04N 5/232* (2006.01)
(52) U.S. Cl. ...................................... 348/349; 348/354
(58) Field of Classification Search .................. 348/347, 348/349, 354–355, 351
See application file for complete search history.

(56) References Cited

U.S. PATENT DOCUMENTS 7,403,229 B2 *   7/2008   Knoedgen et al. ............ 348/347
7,742,233 B2 *   6/2010   Hillis et al. ................... 359/619

* cited by examiner

*Primary Examiner* — Tuan Ho
(74) *Attorney, Agent, or Firm* — Morris Manning & Martin LLP; Tim Tingkang Xia, Esq.

(57) ABSTRACT

An automatic focusing method in a high-noise environment and a digital imaging device using the same are used for determining an object distance. The method includes taking two digital images at a farthest object distance and taking two digital images at a nearest object distance, under a first exposure condition and a second exposure condition; capturing digital images under the first exposure condition at a plurality of different object distances other than the farthest and nearest object distances; selecting at least two images captured at adjacent object distances to create a composite image; calculating an object distance of the composite image; calculating high-frequency signals of the second farthest object distance image, the second nearest object distance image, and the composite image in the focusing frame; determining from the images an object distance corresponding to the maximum high-frequency signal; and moving an automatic focusing lens to the object distance.

10 Claims, 8 Drawing Sheets

AUTOMATIC FOCUSING METHOD IN HIGH-NOISE ENVIRONMENT AND DIGITAL IMAGING DEVICE USING THE SAME

CROSS-REFERENCE TO RELATED APPLICATIONS

This non-provisional application claims priority under 35 U.S.C. §119(a) on Patent Application No(s). 097151793 filed in Taiwan, R.O.C. on Dec. 31, 2008, the entire contents of which are hereby incorporated by reference.

BACKGROUND OF THE INVENTION

1. Field of Invention

The present invention relates to an automatic focusing method and a digital imaging device using the same, and more particularly to an automatic focusing method in a high noise environment and a digital imaging device using the same.

2. Related Art

With the development of digital cameras, photographing has been no longer a costly consumption. A user can take a desired image at will to record a moment or scenario worth memorizing. Generally, most cameras have the automatic focusing function in order to obtain an image with high definition when photographing.

Figure 1A:
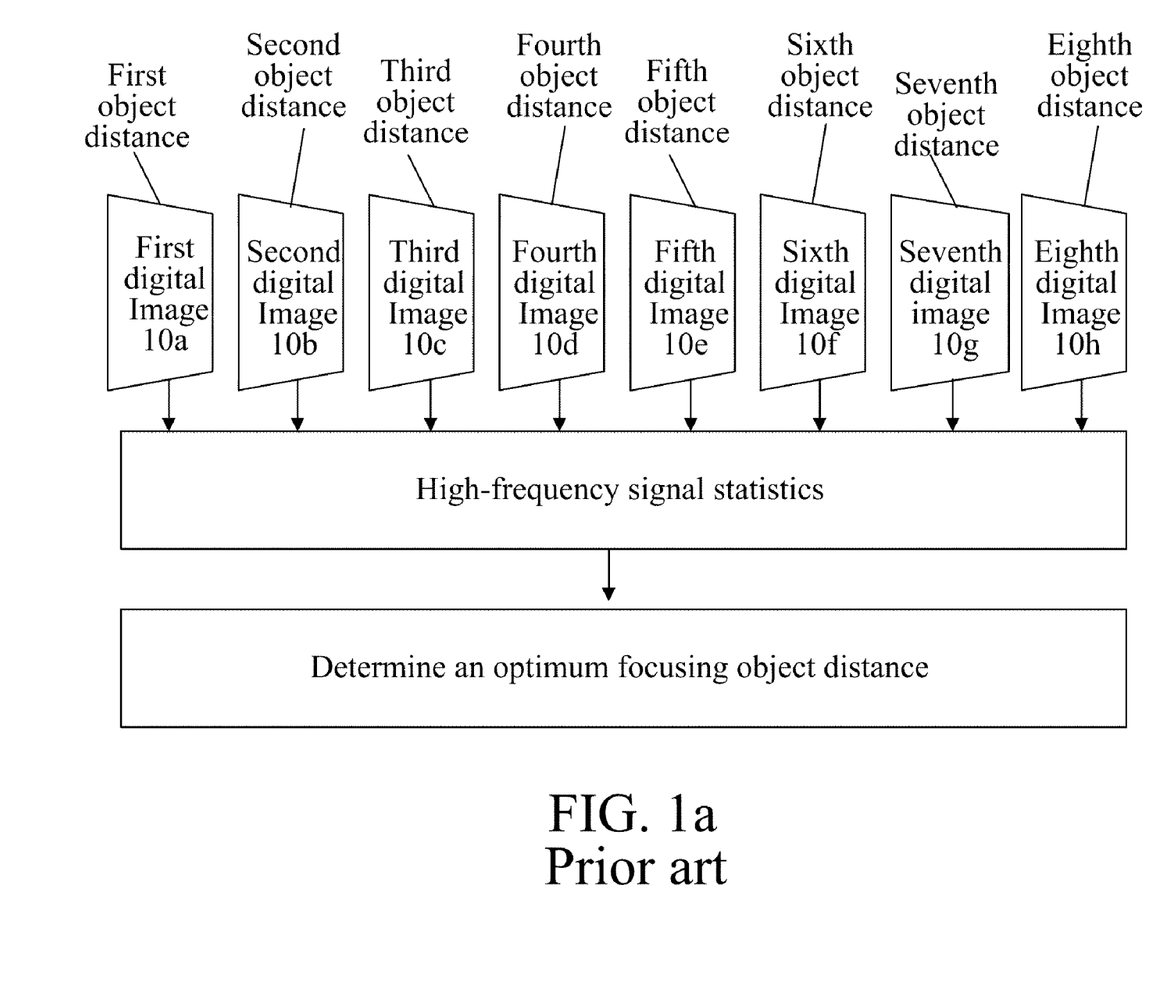
FIG. 1a is a schematic view of high-frequency signals being calculated with multiple images in the prior art.
Figure 1B:
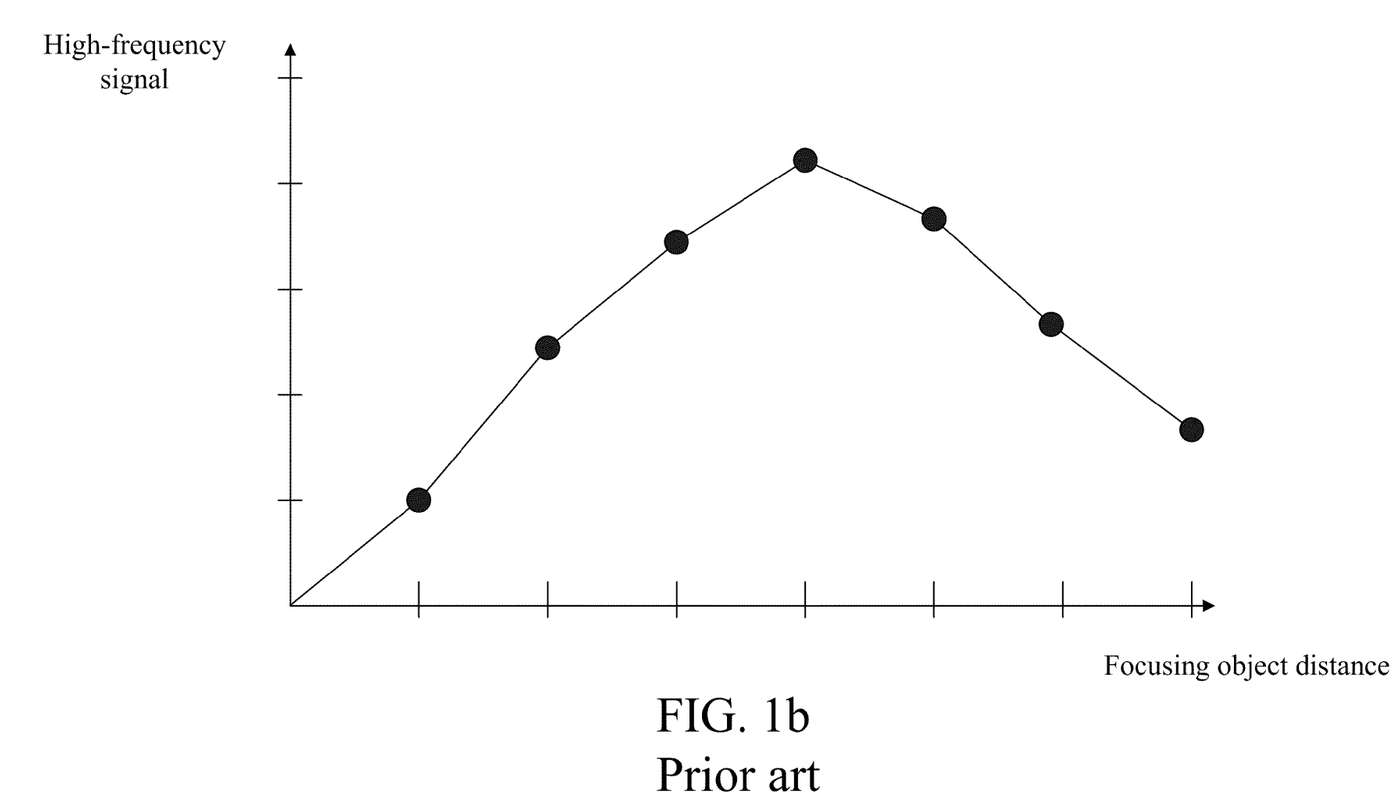
FIG. 1b is a schematic curve graph for the high-frequency signals and the object distances generated in the prior art.

With reference to FIG. 1a, in the prior art of focusing, corresponding digital images 10a,10b,10c,10d,10e,10f,10g, 10h are captured at different object distances. The digital camera would calculate the high-frequency signal in the focusing frame for each digital image, and a curve graph for the objects distance and the high-frequency signals as shown in FIG. 1b is derived. Then the object distance corresponding to the maximum high-frequency signal, which is the optimum focusing object distance, is found out by using the conventional curve fitting and solving technology. Finally, the focusing group of the lens is moved to the optimum focusing position and focusing is thus accomplished.

Figure 1C:
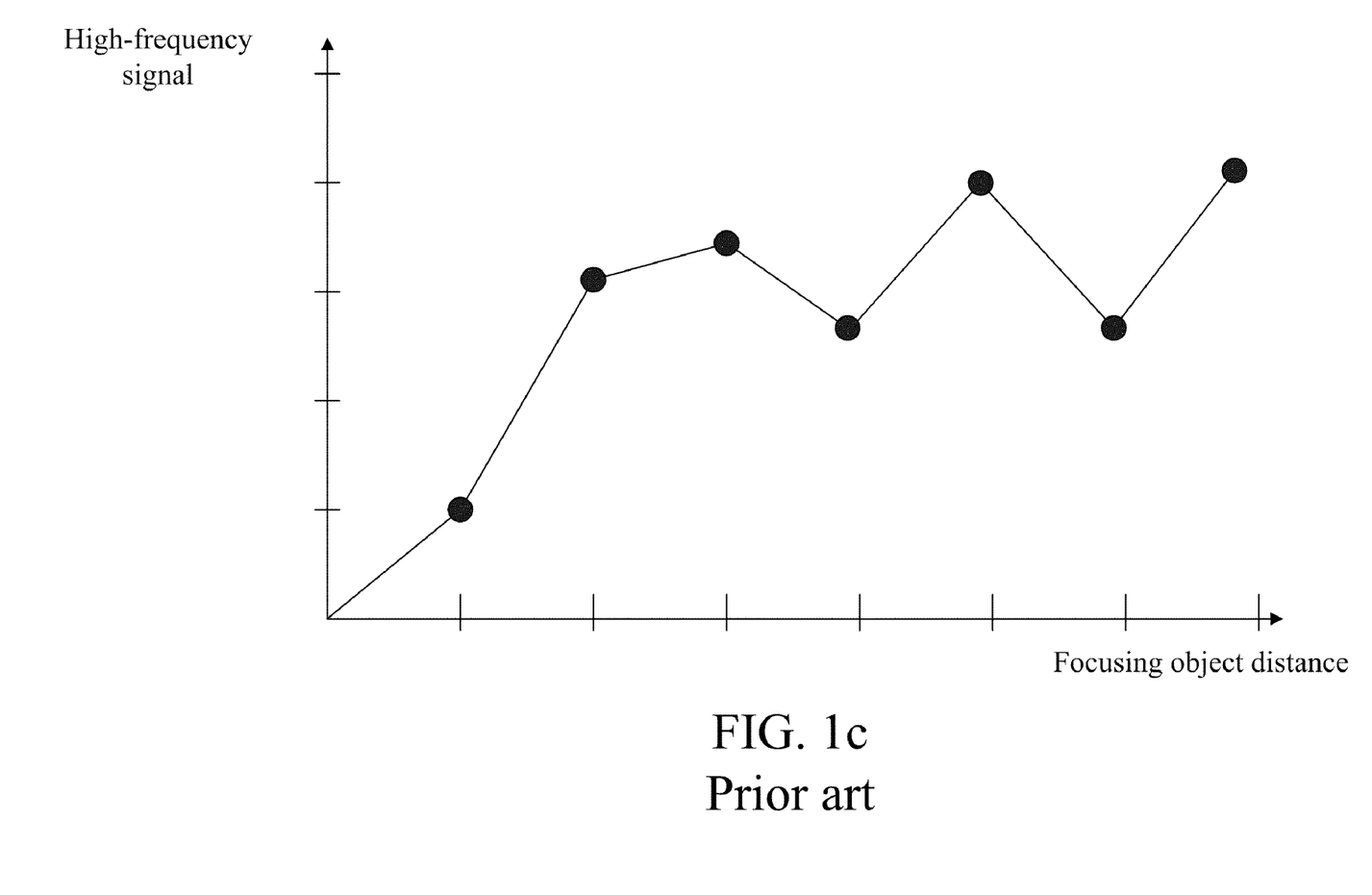
FIG. 1c is a schematic curve graph for the high-frequency signals and the object distances for a high noise digital image generated at a low luminance in the prior art.

However, when a photo needs to be taken under a high international standards organization (ISO) condition in an environment with low luminance, noises are likely to occur in the digital image. For the digital images captured under low contrast and high ISO conditions, the noise reduction effects of conventional de-noising algorithms are rather limited. Moreover, the details of the scenery in the digital image are often out of focus, so that the automatic focusing module in the digital camera fails to obtain an effective high-frequency signal in the case of extremely high noises. In this case, with the focusing technology in the prior art, a curve graph for the object distance and the high-frequency signal as shown in FIG. 1c tends to be resulted in, where no apparent global maximum exists, so that the focusing object distance determined by the automatic focusing procedure is not the most accurate one.

SUMMARY OF THE INVENTION

In view of the above problem, the present invention is an automatic focusing method in a high-noise environment.

In order to achieve the above objective, the present invention provides an automatic focusing method, which comprises taking a first farthest object distance image under a first exposure condition and a second farthest object distance image under a second exposure condition at a farthest object distance; taking a first nearest object distance image under the first exposure condition and a second nearest object distance image under the second exposure condition at a nearest object distance of the digital imaging device; capturing corresponding digital images under the first exposure condition at M different object distances other than the farthest and nearest object distances respectively; and storing the total M+2 digital images captured under the first exposure condition at the farthest and nearest object distances and the M different object distances and the 2 digital images captured under the second exposure condition in a storage unit.

Then, the M+2 digital images taken under the first exposure condition are loaded. Every N (N<M+2) digital images are superposed to create (M−N+3) composite images. The object distances corresponding to the (M−N+3) composite images are redefined. The high-frequency signals in the focusing regions of the (M−N+3) composite images are calculated.

The 2 digital images taken under the second exposure condition are loaded, and the high-frequency signals in the focusing regions of the 2 images are calculated. The object distances of the 2 images are just the farthest and nearest object distances and thus need not to be re-determined. The relation between the high-frequency signal and the object distance is integrated into the relation between the high-frequency signal from the composite image and the corresponding object distance noted in the preceding paragraph. Based on this, the object distance corresponding to the maximum high-frequency signal is determined as the optimum focusing object distance. The automatic focusing lens is moved to the optimum focusing object distance and focusing is thus accomplished.

The present invention provides a digital imaging device with automatic focusing in a high-noise environment for determining the object distance between the digital imaging device and the object to be photographed.

In order to achieve the above objective, the present invention provides a digital imaging device, which comprises an automatic focusing lens, a photo-sensing element, a storage unit, and a microprocessor. The automatic focusing lens is used to adjust the object distance between the digital imaging device and the object to be photographed. The photo-sensing element is used to record the brightness of the environment and object to be photographed by the digital imaging device, and convert the brightness of the object to be photographed into an electrical signal. The storage unit is used to store a plurality of digital images. The microprocessor is electrically connected to the photo-sensing element and the storage unit. The microprocessor comprises at least an image superposing unit, an object distance resetting unit, a high-frequency signal calculation unit, and an optimum focusing position determination unit.

In terms of the features and implementations of the present invention, embodiments are to be described in detail in conjunction with the drawings hereinafter.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2A:
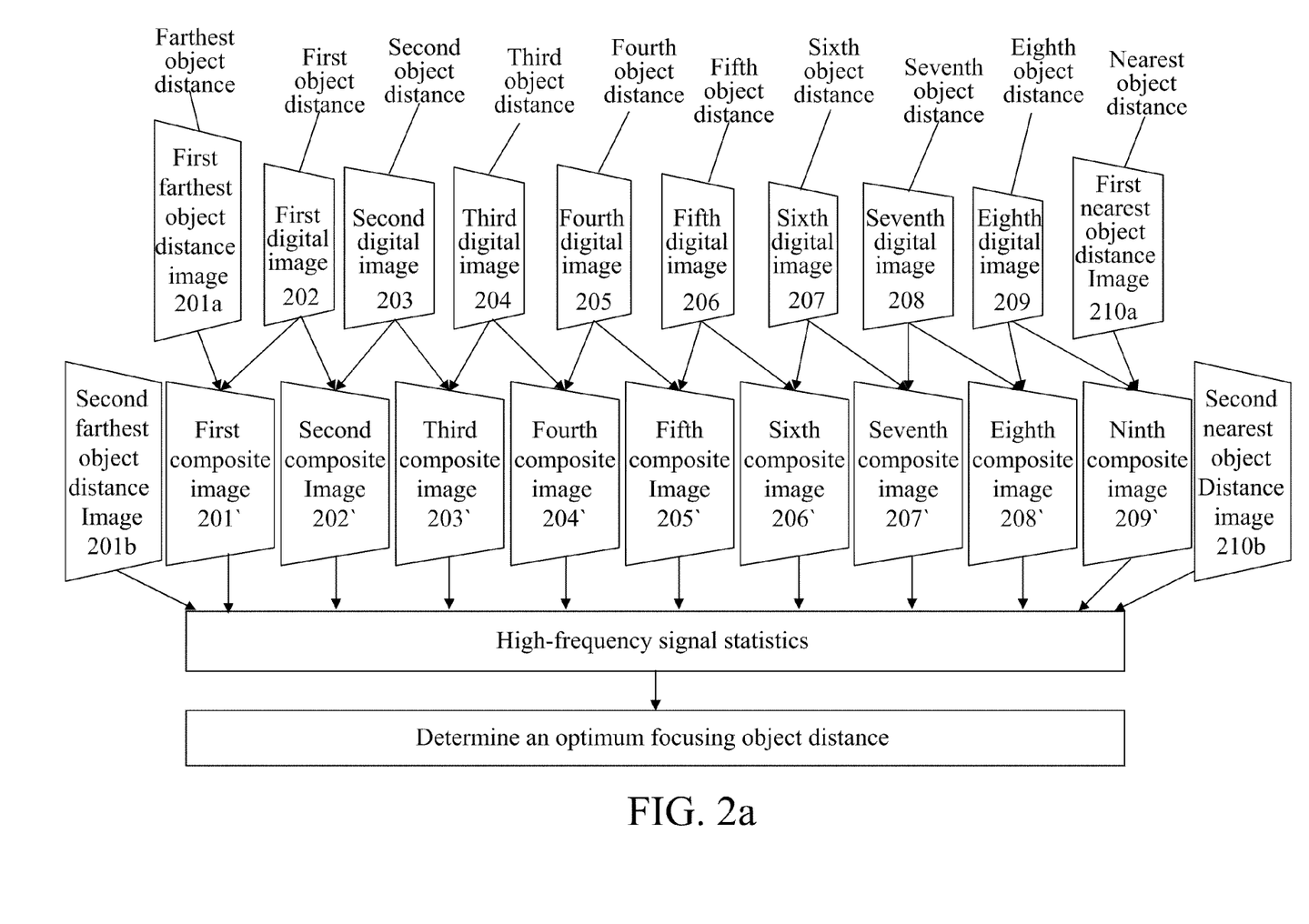
FIG. 2a is a schematic view of superposing two images and calculating the high-frequency signals according to the present invention.

Refer to FIG. 2a for a clear description of the basic operation flow of the present invention. First a first farthest object distance image 201a is taken under a first exposure condition and a second farthest object distance image 201b is taken at under a second exposure condition at a farthest object distance. A plurality of corresponding digital images shown in FIG. 2a, namely a first digital image 202, a second digital image 203, a third digital image 204, a fourth digital image 205, a fifth digital image 206, a sixth digital image 207, a seventh digital image 208, and an eighth digital image 209 in FIG. 2a, are respectively captured under the first exposure condition at M different object distances other than the farthest and nearest object distances, supposing M=8 in FIG. 2a. A first nearest object distance image 210a is taken under the first exposure condition and a second nearest object distance image 210b is taken under the second exposure condition at the minimum object distance of the digital imaging device. A total of 10 (M+2=10) images are captured under the first exposure condition. Each digital image $P_M$ has a corresponding Mth object distance position $S_M$. The object distance corresponding to the first farthest object distance image 201a and the second farthest object distance image 201b is $S_1$. The object distance corresponding to the first digital image 202 is $S_2$. The object distance corresponding to the second digital image 203 is $S_3$. The object distance corresponding to the third digital image 204 is $S_4$. The object distance corresponding to the fourth digital image 205 is $S_5$. The object distance corresponding to the fifth digital image 206 is $S_6$. The object distance corresponding to the sixth digital image 207 is $S_7$. The object distance corresponding to the seventh digital image 208 is $S_8$. The object distance corresponding to the eighth digital image 209 is $S_9$. The object distance corresponding to the first nearest object distance image 210a and the second nearest object distance image 210b is $S_{10}$. $S_1$ is the farthest object distance and $S_{10}$ is the nearest object distance.

Then the digital images (202-209) taken under the first exposure condition are loaded, and every N (N<M) consecutive digital images are superposed to create (M−N+3) composite images, supposing N=2 in FIG. 2a. As such, a total of 9 composite images (M−N+3=8−2+3=9) are obtained after the superposing calculation.

Next, the object distances corresponding to the (M−N+3) composite images are redefined. The redefinition process is described as follows with reference to FIG. 2a. The object distance for the first farthest object distance image 201a is $S_1$, and the object distance for the first digital image 202 is $S_2$. The first farthest object distance image 201a and the first digital image 202 are superposed to create a first composite image 201'. The object distance for the first composite image 201' is S1', which is the median point of S1 and S2, i.e., S1'=(S1+S2)/2.

Every two adjacent digital images are sequentially selected and the object distances of the two digital images are reset. The relation between the composite images and the new object distances is shown in Table 1 below.

TABLE 1

Relational table for the composite images and the object distances

| Composite image | 201' | 202' | 203' | 204' | 205' | 206' | 207' | 208' | 209' |
|---|---|---|---|---|---|---|---|---|---|
| Object distance | S1' | S2' | S3' | S4' | S5' | S6' | S7' | S8' | S9' |

A focusing frame is arranged for selecting some of the above digital images. Subsequently, the high-frequency signals in the focusing frames of the first to ninth composite images (201', 202', . . . and 209') are calculated, and the high-frequency signals in the focusing frames of the second farthest object distance image 201b and the second nearest object distance image 210b are also calculated. A corresponding object distance is found out based on the high-frequency signal of each of the images. In the present invention, a set of the largest ones is selected from the high-frequency signals of the images to be output as the optimum focusing object distance. Since the second farthest object distance image 201b and the second nearest object distance image 210b have not been composed with other images, the corresponding object distances thereof are still the farthest object distance $S_1$ and the nearest object distance $S_{10}$.

Figure 2B:
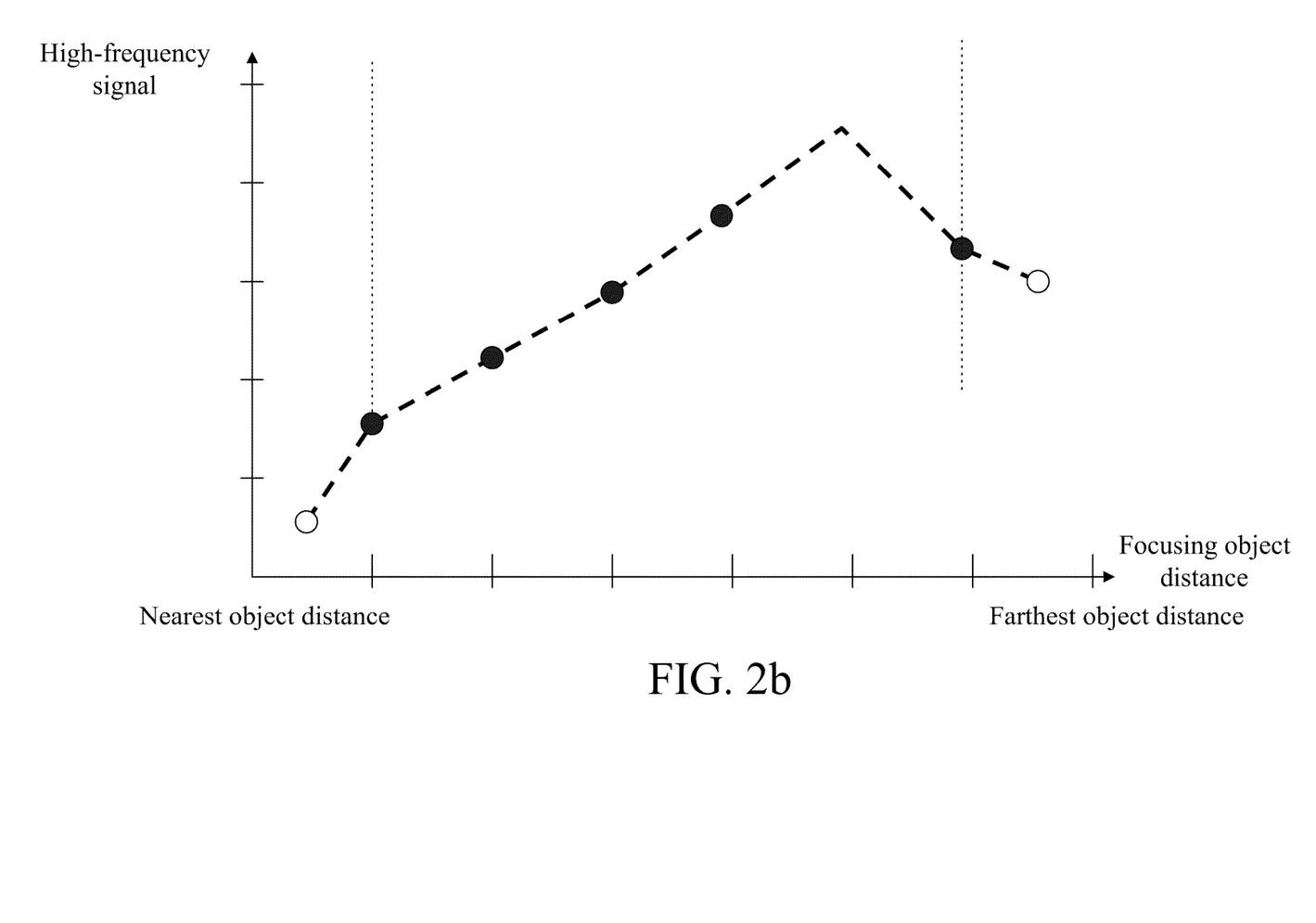
FIG. 2b is a schematic curve graph of the high-frequency signals and the object distances for a high noise digital image generated at a low luminance according to the present invention.

As the noises in the composite images have been considerably reduced, the high-frequency signals are mostly originated from details of the object being photographed instead of the high-frequency noises. As such, the relation between the high-frequency signals and their corresponding object distances shown in FIG. 2b is derived through such a calculation, in which an apparent global maximum exists. Compared with FIG. 1c from the prior art, the present invention can gain a curve relation of focusing position that is more apparent, and the success ratio for object distance determination is improved.

Finally, based on the relation between the high-frequency signals and their corresponding object distances, the object distance corresponding to the maximum high-frequency signal is determined as an optimum focusing object distance. The automatic focusing lens is moved to the optimum focusing object distance, and focusing is thus accomplished.

Figure 3:
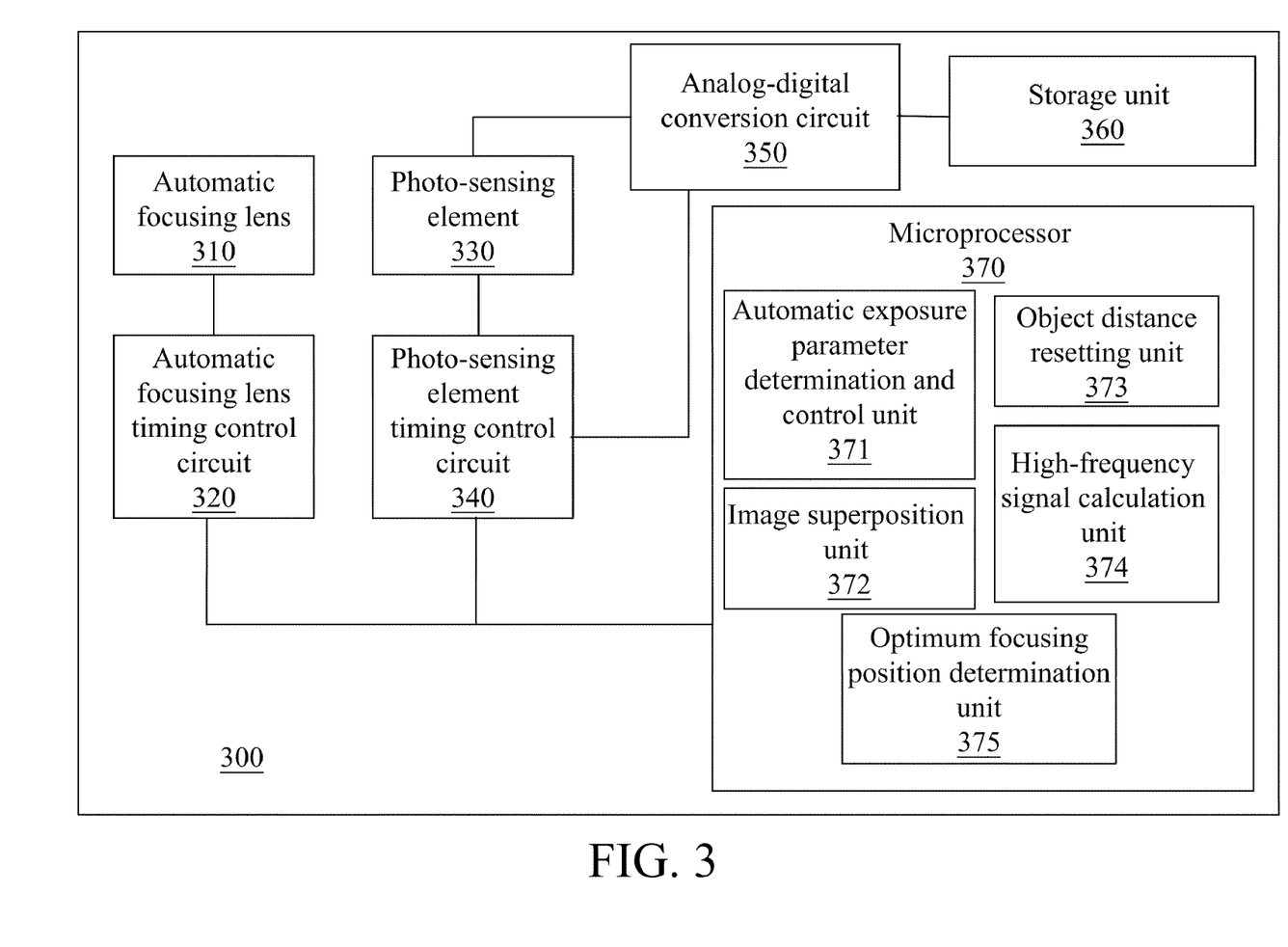
FIG. 3 is an architectural view of the present invention.

In practical implementation, refer to FIG. 3, which is an architectural view of the present invention. A digital imaging device 300 according to the present invention comprises an automatic focusing lens 310, an automatic focusing lens timing control circuit 320, a photo-sensing element 330, a photo-sensing element timing control circuit 340, an analog-digital conversion circuit 350, a storage unit 360, and a microprocessor 370.

The automatic focusing lens 310 is electrically connected to the automatic focusing lens timing control circuit 320. The automatic focusing lens timing control circuit 320 is electrically connected to the microprocessor 370, for receiving instruction signals from the microprocessor 370 to drive the automatic focusing lens 310. The automatic focusing lens timing control circuit 320 controls the automatic focusing lens 310 to be moved, and images the environment and object being photographed onto the photo-sensing element 330. The photo-sensing element 330 is a photoelectric conversion element, which serves to record the optical signals of the environment and object being photographed, and convert the optical signal into an electrical signal. The photo-sensing element 330 may be, for example, a charge-coupled device (CCD) or a Complementary Metal-Oxide-Semiconductor (CMOS).

The photo-sensing element 330 is used to record the brightness of the environment and object being photographed by the digital imaging device 300 and convert the brightness of the object being photographed into an electrical signal. The photo-sensing element timing control circuit 340 is electrically connected between the photo-sensing element 330 and the microprocessor 370, and generates a control signal under control of the microprocessor 370 for driving the photo-sensing element 330. The analog-digital conversion circuit 350 is electrically connected to the photo-sensing element 330, the photo-sensing element timing control circuit 340, and the storage unit 360, and is used to convert the analog signal from the photo-sensing element 330 into a digital signal under control of the photo-sensing element timing control and driving circuit 340, and transmit the digital signal to the storage unit 360 for storage.

The storage unit 360 utilized to store a plurality of digital images is electrically connected to the analog-digital conversion circuit 350 and the microprocessor 370. The storage unit 360 is used to perform data read/write operation under control of the microprocessor 370. In practical implementation, the microprocessor 370 comprises an automatic exposure parameter determination and control unit 371, an image superposition unit 372, an object distance resetting unit 373, a high-frequency signal calculation unit 374, and an optimum focusing position determination unit 375.

In practical implementation, the automatic exposure parameter determination and control unit 371 determines two proper sets of exposure parameters, namely the first exposure condition and the second exposure condition, depending on the photographing environment. The exposure condition comprises the exposure time, the aperture size, and the International Standards Organization (ISO). Then the microprocessor 370 sets the aperture of the automatic focusing lens 310 through the automatic focusing lens timing control circuit 320 and sets the exposure time and the ISO value through the photo-sensing element timing control circuit 340. M+2 respective digital images are captured under the first exposure condition at the farthest object distance, the nearest object distance, and other different M object distances, and are stored in the storage unit 360. Two corresponding digital images are captured under the second exposure condition at the farthest object distance and the nearest object distance, and are stored in the storage unit 360.

The microprocessor 370 then controls the image superposition unit 372, the object distance resetting unit 373, the high-frequency signal calculation unit 374, and the optimum focusing position determination unit 375 arranged therein for activation. The image superposition unit 372 is used to superpose the pre-photographed images to create multiple composite images. The object distance resetting unit 373 is used to calculate the object distance corresponding to each composite image and obtain corresponding object distances of the same number as that of the composite images.

The object distance resetting unit 373 is used to calculate the object distance corresponding to each composite image (201'-209') and derive corresponding object distances of the same number as that of the composite images. The high-frequency signal calculation unit 374 is used to calculate the high-frequency signal for at least some pixels in each composite image and obtain the high-frequency signals of the same number as that of the composite images. The high-frequency signal calculation unit 374 is a high-pass filter, a band-pass filter, a Fourier transformation device, a discrete cosine transformation device, or a discrete wavelet transformation device.

Depending on the relational curve for the farthest object distance, the object distances corresponding to the composite images, and the nearest object distance, and the high-frequency signals corresponding thereto, the optimum focusing position determination unit 375 determines the object distance corresponding to the maximum high-frequency signal as the optimum focusing object distance, with which the object to be photographed is photographed.

Figure 4A:
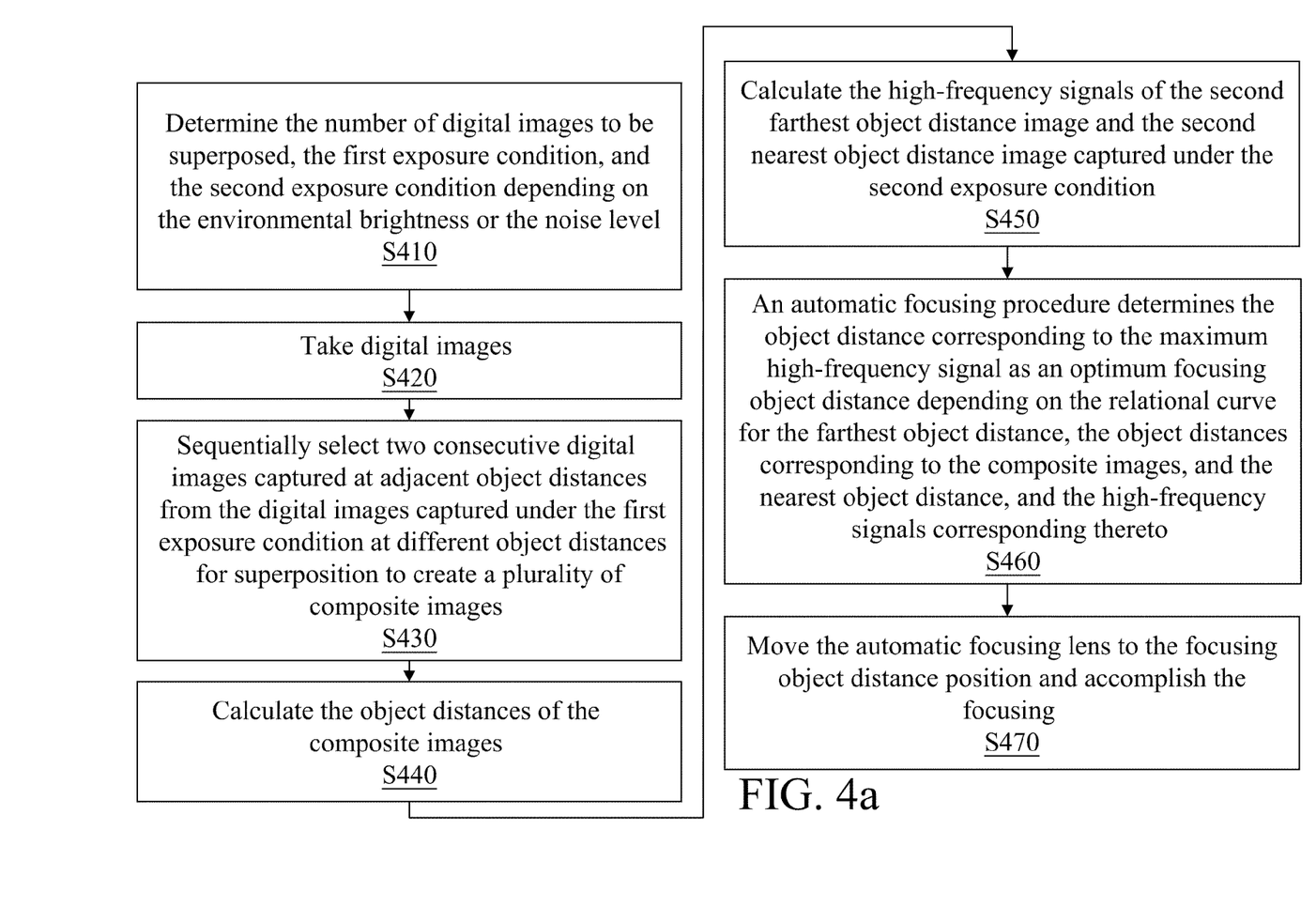
FIG. 4a is a flow chart of implementation of an embodiment according to the present invention.

For convenience of description, the number of images to be superposed is assumed to be n. The exposure parameters for the object to be photographed are decided. For the image, the exposure time is t, the ISO is g, the first exposure condition is denoted as (t, g), and the second exposure condition is denoted as (n*t, g/n). Referring to FIG. 4a together, a flow chart for practical implementation of the present invention is shown. The implementation is described as follows.

In Step S410, the number of digital images to be superposed, the first exposure condition, and the second exposure condition are determined depending on the environmental brightness and the noise level.

In Step S420, digital images are taken.

Figure 4B:
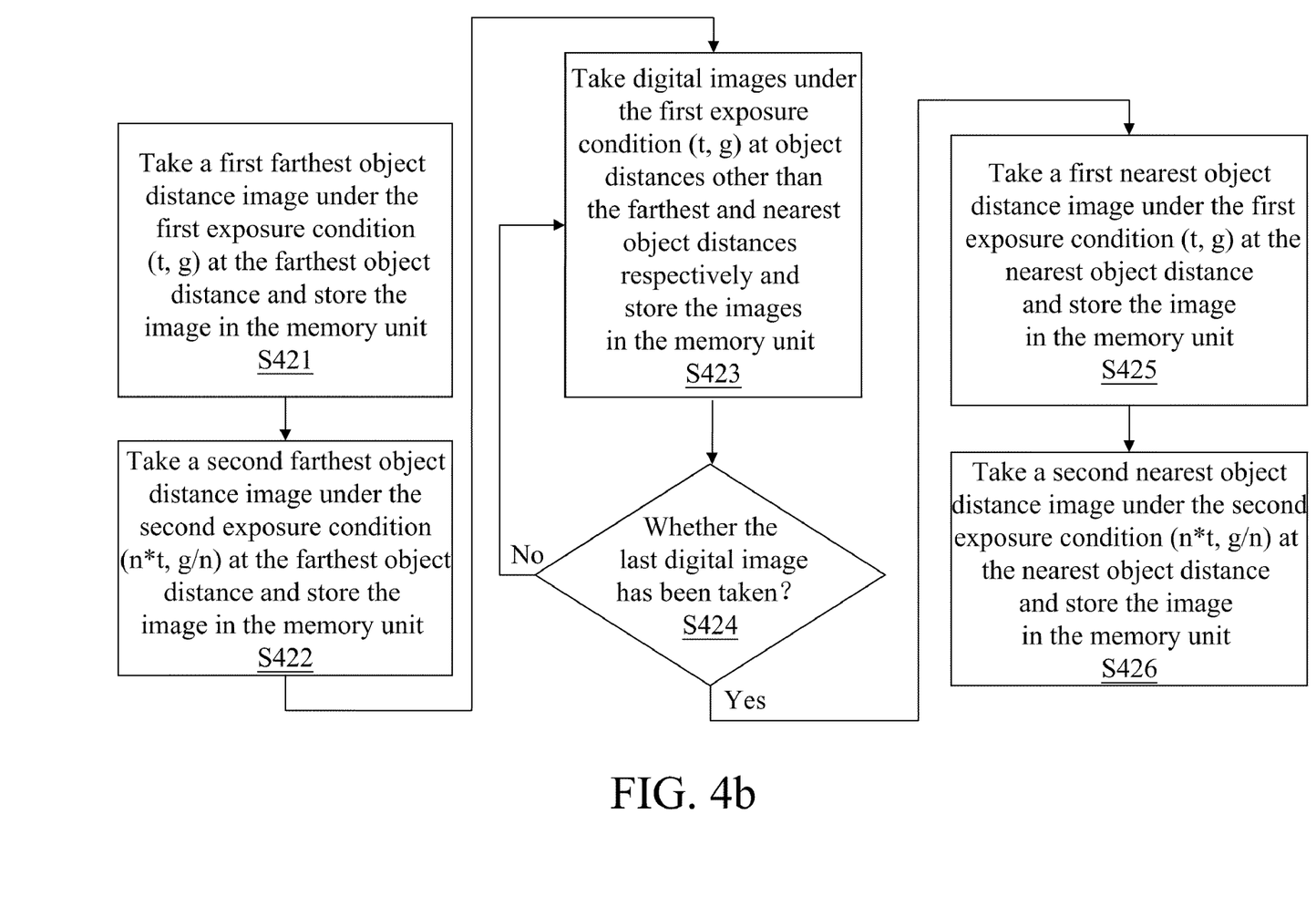
FIG. 4b is a detailed flowchart for taking a digital image according to the present invention.

The action of taking digital images in Step S420 further comprises steps shown in FIG. 4b.

In Step S421, a first farthest object distance image 201a is taken under the first exposure condition (t, g) at the farthest object distance and stored in the memory unit.

In Step S422, a second farthest object distance image 201b is taken under the second exposure condition (n*t, g/n) at the farthest object distance and stored in the memory unit.

In Step S423, digital images are taken under the first exposure condition (t, g) at object distances other than the farthest and nearest object distances respectively and stored in the memory unit.

In Step S424, it is determined whether the last digital image has been taken, and if not, Steps S241 to S243 are repeated until images have been captured at all the predetermined object distances.

In Step S425, a first nearest object distance image 210a is taken under the first exposure condition (t, g) at the nearest object distance and stored in the memory unit.

In Step S426, a second nearest object distance image 210b is taken under the second exposure condition (n*t, g/n) at the nearest object distance and stored in the memory unit.

In this description, images are captured from the farthest object distance to the nearest object distance, while in practical implementation, images may also be taken from the nearest object distance to the farthest object distance.

In Step S430, two consecutive digital images captured at adjacent object distances are sequentially selected from the digital images captured under the first exposure condition at different object distances for superposition to create a plurality of composite images.

In Step S440, the object distances of the composite images are calculated.

In Step S450, the high-frequency signals from the second farthest object distance image 201b and the second nearest object distance image 210b captured under the second exposure condition are calculated.

In Step S460, depending on the relational curve for the farthest object distance, the object distances corresponding to the composite images, and the nearest object distance, and the high-frequency signals corresponding thereto, an automatic focusing procedure determines the object distance corresponding to the maximum high-frequency signal as an optimum focusing object distance.

In Step S470, the automatic focusing lens is moved to the focusing object distance position and focusing is thus accomplished.

For the purpose of description, eight object distances are taken as example. The digital images captured at the corresponding object distances are respectively defined as a first digital image 202, a second digital image 203, a third digital image 204, a fourth digital image 205, a fifth digital image 206, a sixth digital image 207, a seventh digital image 208, and an eighth digital image 209.

Then, after the digital images (202-209) have been processed by Step S430, a first composite image 201', a second composite image 202', a third composite image 203', a fourth composite image 204', a fifth composite image 205', a sixth composite image 206', a seventh composite image 207', an eighth composite image 208', and a ninth composite image 209' are created, and the high-frequency signals of the composite images are calculated.

When the high-frequency signals are calculated in Step S430 and Step S450, besides calculating the high-frequency signal for the whole digital image, the high-frequency signal may alternatively be calculated for a partial image region in the digital image. Calculation of the high-frequency signals may be performed by, but not limited to, a high-pass filter, a band-pass filter, Fourier transformation, discrete cosine transformation, or discrete wavelet transformation.

Although embodiments of the present invention have been disclosed as above, they are not intended to limit the present invention. For example, in the present invention, the order of the high-frequency signals for the composite images and the digital images taken under the second exposure condition is not restricted, as long as the correspondence with the respective object distances are right. In other words, the digital images taken under the second exposure condition may be calculated at first, and then the composite images are calculated. Alternatively, the high-frequency signals for the digital images taken under the second exposure condition at the farthest object distance may be calculated at first, and then the high-frequency signals for the composite images are calculated. The high-frequency signals for the digital images taken under the second exposure conditions at the nearest object distance are calculated at last.

What is claimed is:

1. An automatic focusing method in a high-noise environment, applicable to a digital imaging device for adjusting focus distances for at least one object to be photographed, the automatic focusing method comprising:

taking a first farthest object distance image under a first exposure condition and a second farthest object distance image under a second exposure condition at a farthest object distance of the digital imaging device;

taking a first nearest object distance image under the first exposure condition and a second nearest object distance image under the second exposure condition at a nearest object distance of the digital imaging device;

capturing at least one corresponding digital image under the first exposure condition at different object distances between the farthest object distance and the nearest object distance respectively;

selecting at least two digital images taken at adjacent object distances sequentially from the digital images to create a composite image, repeating the step until all the digital images captured under the first exposure condition have been superposed sequentially to create the composite images;

calculating an object distance corresponding to each of the composite images;

calculating high-frequency signals of some pixels in the composite images;

calculating the high-frequency signals of at least some pixels in the second farthest object distance image;

calculating the high-frequency signals of at least some pixels in the second nearest object distance image; and determining an object distance corresponding to the maximum high-frequency signal as an optimum focusing object distance depending on the relational curve for the farthest object distance, the object distances corresponding to the composite images, and the nearest object distance and corresponding high-frequency signals corresponding thereto, and photographing the object to be photographed.

2. The automatic focusing method in a high-noise environment according to claim 1, wherein the step of creating the composite images further comprises:

determining the number of the digital images to be superposed; and selecting the consecutive digital images to superpose.

3. The automatic focusing method in a high-noise environment according to claim 2, wherein the number of the digital images to be superposed is determined based on an environmental brightness or a noise level.

4. The automatic focusing method in a high-noise environment according to claim 1, wherein the high-frequency signals are calculated by a high-pass filter, a band-pass filter, Fourier transformation, discrete cosine transformation, or discrete wavelet transformation.

5. A digital imaging device with automatic focusing in a high-noise environment, applicable for determining an object distance for at least one object to be photographed, the device comprising:

a storage unit, for storing a first farthest object distance image, a second farthest object distance image, a first nearest object distance image, a second nearest object distance image, and at least one digital image, wherein the first farthest object distance image is taken under a first exposure condition and the second farthest object distance image is taken under a second exposure condition at a farthest object distance, the first nearest object distance image is taken under the first exposure condition and the second nearest object distance image is taken under the second exposure condition at a nearest object distance, and the corresponding digital images are captured under the first exposure condition at different object distances other than the farthest and nearest object distances;

a microprocessor, electrically connected to the storage unit, for loading the digital images, the first farthest object distance image, the second farthest object distance image, the first nearest object distance image, and the second nearest object distance image;

an image superposition unit, arranged in the microprocessor, for selecting at least two adjacent digital images sequentially captured at the different object distances from the digital images to create a composite image;

an object distance calculation unit, arranged in the microprocessor, for calculating an object distance corresponding to each of the composite images;

a high-frequency signal calculation unit, arranged in the microprocessor, for deriving a corresponding high-frequency signal from at least some pixels in the composite images, the second farthest object distance image, and the second nearest object distance image; and an optimum focusing position determination unit, arranged in the microprocessor, for determining an object distance corresponding to the maximum high-frequency signal as an optimum focusing object distance depending on the relational curve for the farthest object distance, the object distances corresponding to the composite images, and the nearest object distance, and the high-frequency signals corresponding thereto, thereby photographing the object to be photographed.

6. The digital imaging device with automatic focusing in a high-noise environment according to claim 5, further comprising an automatic focusing lens and an automatic focusing lens timing control circuit, wherein the automatic focusing lens timing control circuit is electrically connected to the automatic focusing lens and the microprocessor, and the microprocessor controls the automatic focusing lens timing control circuit to generate at least one instruction signal for driving the automatic focusing lens.

7. The digital imaging device with automatic focusing in a high-noise environment according to claim 5, further comprising a photo-sensing element and a photo-sensing element timing control circuit, wherein the photo-sensing element timing control circuit is electrically connected to the photo-sensing element and the microprocessor, and the microprocessor controls the photo-sensing element timing control circuit to generate at least one control signal for driving the photo-sensing element, thereby causing the photo-sensing element to generate at least one analog signal.

8. The digital imaging device with automatic focusing in a high-noise environment according to claim 7, further comprising an analog-digital conversion circuit electrically connected to the photo-sensing element, the photo-sensing element timing control circuit, and the storage unit, wherein the analog-digital conversion circuit converts the analog signal into a digital signal, and stores the digital signal into the storage unit under control of the photo-sensing element timing control circuit and the microprocessor.

9. The digital imaging device with automatic focusing in a high-noise environment according to claim 5, further comprising an automatic exposure parameter determination and control unit arranged in the microprocessor, for determining at least one of an exposure time, an aperture size, and an ISO value used in photographing the object to be photographed based on the environment in which the digital imaging device is photographing.

10. The digital imaging device with automatic focusing in a high-noise environment according to claim 5, wherein the high-frequency signal calculation unit is a high-pass filter, a band-pass filter, a Fourier transformation device, a discrete cosine transformation device, or a discrete wavelet transformation device.

\* \* \* \* \*